United States Patent [19]

Watanabe et al.

[11] Patent Number: 4,621,453
[45] Date of Patent: Nov. 11, 1986

[54] CONSTRUCTION OF DOOR IN MOTOR VEHICLE

[75] Inventors: Hiroyuki Watanabe; Eiichi Hamada, both of Toyota; Motomu Hayashi, Okazaki; Kenji Ono, Toyota, all of Japan

[73] Assignee: Toyota Jidoshi Kabushiki Kaisha, Aichi, Japan

[21] Appl. No.: 635,246

[22] Filed: Jul. 27, 1984

[30] Foreign Application Priority Data

Jul. 29, 1983 [JP] Japan .......................... 58-119491[U]

[51] Int. Cl.⁴ ............................................ E05F 11/38
[52] U.S. Cl. ........................................ 49/374; 49/227
[58] Field of Search ............... 49/374, 227, 226, 360, 49/502; 296/246

[56] References Cited

U.S. PATENT DOCUMENTS

| | | | |
|---|---|---|---|
| 3,162,281 | 12/1964 | Kraska et al. | 49/374 |
| 3,385,000 | 5/1968 | Sturtevant et al. | 49/374 |
| 3,566,540 | 3/1971 | Hewitt | 49/374 |
| 3,591,982 | 7/1971 | Nantau | 49/227 |
| 3,591,983 | 7/1971 | Hanson | 49/227 |
| 3,808,743 | 5/1974 | Renner et al. | 49/374 |
| 3,844,064 | 10/1974 | Yamaha et al. | 49/227 |
| 4,051,632 | 10/1977 | Fukumoto et al. | 49/227 |
| 4,219,968 | 9/1980 | Sakai et al. | 49/227 |
| 4,417,419 | 11/1983 | Rossie et al. | 49/348 |
| 4,454,688 | 6/1984 | Rest et al. | 49/374 |
| 4,457,109 | 7/1984 | Royse | 49/374 |
| 4,490,942 | 1/1985 | Arnheim et al. | 49/374 |
| 4,503,639 | 3/1985 | Rossie et al. | 49/227 |

FOREIGN PATENT DOCUMENTS

| | | | |
|---|---|---|---|
| 2634778 | 6/1977 | Fed. Rep. of Germany | 49/227 |
| 1190350 | 5/1970 | United Kingdom | 49/374 |

*Primary Examiner*—Victor N. Sakran
*Attorney, Agent, or Firm*—Finnegan, Henderson, Farabow, Garrett & Dunner

[57] ABSTRACT

A vehicle door comprising a door section having a door panel and a window frame, wherein the door panel includes an inner housing extending between an exterior and an interior of the vehicle. A door glass is slidably mounted between the window frame and the inner housing. The door glass has an arcuate configuration when viewed in cross section in the direction of the length of the vehicle and defines a projected normal arc of curvature corresponding to the arcuate configuration of the door glass when the door glass is in a closed position. The projected normal arc of curvature extends downward from a closed position of the door glass. A guide channel is provided for guiding the door between the closed position and an open position. The guide channel defines an actual arc of curvature when viewed in cross section in the direction of the length of the vehicle, which is displaced radially inwardly from the normal arc of curvature. Therefore, the door glass is slidably positioned to be closer to the interior of the vehicle when slid to an open position along the guide channel than if it were slid along the projected normal arc of curvature.

8 Claims, 4 Drawing Figures

CONSTRUCTION OF DOOR IN MOTOR VEHICLE

BACKGROUND OF THE INVENTION

1. Field of the Invention

This invention relates to a construction of a door in a motor vehicle, and more particularly to a construction of a door in a motor vehicle, suitable for use in a so-called flush surface type motor vehicle, wherein the outer surface of a vehicle body and the surface of a door glass are made flush with each other.

2. Description of the Prior Art

In general, a glass for a window in a sashed door for a motor vehicle, in which a frame is provided at the upper portion of a door panel, is guided for opening and closing by glass guides provided on the frame. The glass guides are regulated in position along a direction of the thickness of the door glass.

More recently, there has been adopted a curved surface glass having an outwardly convex curvature in a cross section relative to the vertical line of the door so as to reduce the air resistance during running of the motor vehicle and to meet the requirements of design.

The door glass guides for this curved surface glass must necessarily be formed to have the curvature as the door glass.

Typically, a main body of door comprising a door inner panel and a door outer panel extends substantially vertically, while, a roofside rail portion as the outer end of a roof is disposed at a position offset into a compartment with respect to the main body of the door. As a consequence, the door glass in the fully closed state is canted inwardly to the vehicle body with respect to the main body of door.

In view of the above-described relationship between the main body of the door and the door glass, in order to receive the curved door glass in the main body of door when the window is opened, the thickness of the main body of door, particularly, the thickness at the bottom end portion must be considerably large.

As a consequence, there are presented several disadvantages including the shape of the outer panel of the main body of door unnecessarily bulges out. Additionally, the degree of freedom of design thereof is restricted to a considerable extent. In fact, if the shape of the door outer panel takes precedence, then the door glass must restricted in its curvature.

SUMMARY OF THE INVENTION

It is therefore the primary object of this invention to provide a door in a motor vehicle having a slider, a forward sliding member offset into a compartment and mounted to an end portion of a door glass, the sliding member being slidably guided within guide channels attached to the door frame for opening and closing of the door glass, so that the outer surfaces of the door glass and the door frame are made substantially flush with each other, and the shapes of the door glass and an outer panel of a main body of door can be desirably set.

To this end, the present invention includes guide means and a forward sliding member, said forward sliding member being offset into a compartment and mounted to an end portion of a door glass having an outwardly convex curvature in a cross section to the vertical the sliding member being slidably guided in a guide channel on a door frame for opening and closing of the door glass so that the outer surfaces of the door glass and the door frame are made substantially flush with each other, the guide channel being inwardly offset in a direction of the thickness of the door from an extended curve of the door glass into the main body of door relative the vertical line of the door in such a manner that the lower the portion of the guide channel is more offset inwardly the portion is.

To the above end, the present invention contemplates that a pair of said sliding members are provided at the substantially top and bottom ends of the door glass proximate an end portion of said door glass in the longitudinal direction of the vehicle, wherein the offset value of the lower slider is larger than that of the upper slider.

To the above end, the present invention contemplates that the pair of said sliders are provided at the substantially top and bottom ends of the door glass at least at one end portion of said door glass in the longitudinal direction of the vehicle, wherein the offset values of the both sliders are equal to each other.

To the above end, the present invention also includes a door glass piece having a substantially crank shape in cross section having a forward end offset into the compartment, is the forward end of said door glass piece is extending into a guide groove formed in parallel with said guide channel in a cross section to the vertical line of the door and brought into sliding contact with a seal member disposed in said guide channel, so that a space formed between said door glass and said door frame can be sealed.

To the above end, the present invention also includes a door glass piece secured to an end edge of the door glass and having a forward end offset into the compartment and being of substantially crank shape in cross section, said guide channel being a guide groove formed on the door frame, the forward end of said door glass piece projecting into said groove and brought into sliding contact with a seal member disposed in said guide groove, so that said door glass is regulated in its position and a space formed between said door glass and said door frame may be sealed.

To the above end, the present invention contemplates that a portion of said door glass piece along the inner surface of the door glass is extended to the center of said door glass at a position where a slider is provided so as to form an extension, and said extension together with the slider are fastened and fixed to said door glass through a bolt at a position between said door glass and said slider.

To the above end, the present invention contemplates that an end portion of said door frame, which is opposed to the end portion of said door glass and adjacent the outer surface of said guide groove, is secured thereto with door moldings in a manner to be covered from the outer surface to the inner surface of said door frame, wherein an end portion of said door molding, which is adjacent the outer surface of said guide groove, extends toward said guide groove into the vehicle body are is varied in the vertical direction in accordance with an offset value of said guide groove relative to the outer surface of the door frame in the direction of the thickness of the door.

According to the present invention, the door glass is inwardly offset into the compartment from the extended curve of the door glass into the door panel relative to the vertical, the door glass guided by the guide channels, whereby the door glass can be received in the main body of door without increasing the thickness of the main body of door, so that the curvature of the door glass and the degree of freedom of the shape of the door outer panel is not diminished.

DETAILED DESCRIPTION OF THE PREFERRED EMBODIMENTS

Description will be given of the embodiments of the present invention with reference to the drawings.

Figure 1:
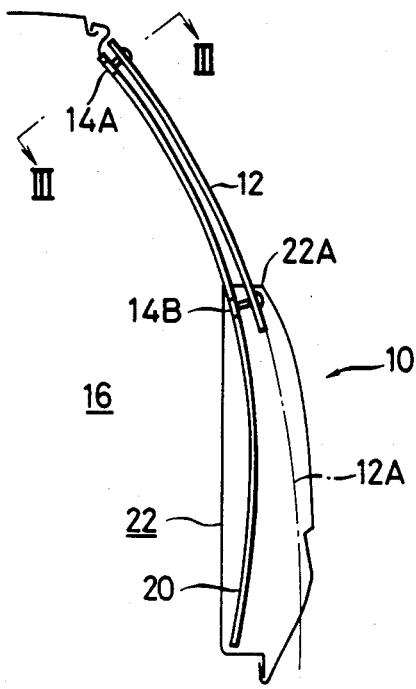
FIG. 1 is a schematic sectional view showing an embodiment of the construction of the door in a motor vehicle according to the present invention.
Figure 2:
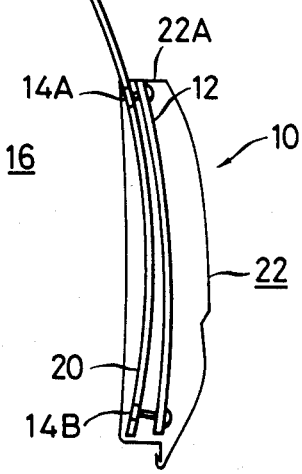
FIG. 2 is a schematic sectional view similar to FIG. 1, showing the fully opened state of the door glass.
Figure 3:
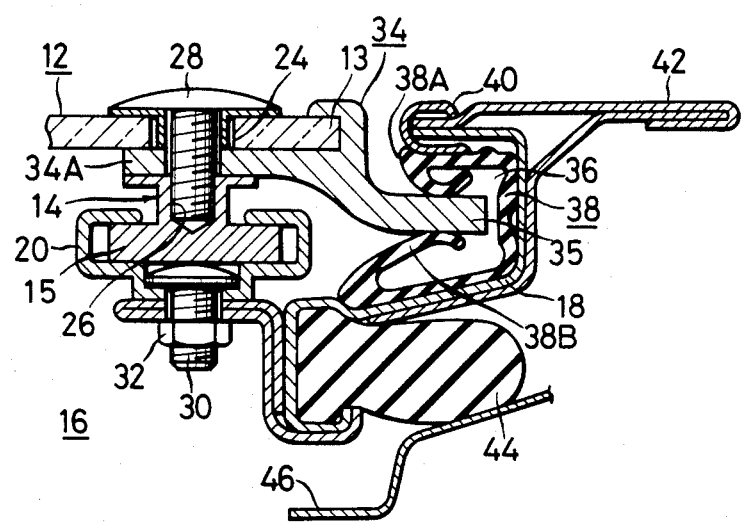
FIG. 3 is an enlarged sectional view taken along the line III—III in FIG. 1.

As shown in FIGS. 1 through 3, a side door 10 in a motor vehicle (not generally shown) includes guide means 14 having a forward sliding members 15, which is offset into a compartment 16 and is mounted to an end portion 13 of a door glass 12. The door glass 15 has an outwardly convex curvature in the cross section relative to the vertical. The sliding member 15 is slidably guided within a guide channel 20 on a door frame 18 for opening and closing of the door glass 12, so that the outer surfaces of the door glass 12 and the door frame 18 are made substantially flush with each other. The guide channel 20 is inwardly offset in a direction of the thickness of the door 10 to accommodate an extended curve 12A of the door glass 12 along the main body of door 10. The lower the base portion of the guide channel 20, the more offset inwardly the base portion is relative to the vertical.

Therefore, as shown in FIG. 1, he door glass has an arcuate configuration defining a projected normal arc of curvature 12A extending from the door glass when the door glass is in a closed position, as viewed in cross section in the direction of the length of the vehicle. On the other hand, the guide channel 20 defines an actual arc of curvature when viewed along the length of the vehicle, as shown in FIG. 1. The actual arc of curvature is displaced radially inward from the projected normal arc of curvature within the door frame 18.

The guide means 14 is fastened and fixed to the door glass 12 through a bolt 28, which extends through a glass hole 24 formed in the door glass 12. The guide means projects inwardly towards the compartment 16 and is threadably coupled to internal threads 26 formed in the guide means 14.

The guide channel 20 has a substantially C-shape in horizontal cross section. The guide channel 20 is fastened and fixed at the center of an end portion thereof on the side of the compartment 16 adjacent to the door frame 18 through a bolt 30 and a nut 32.

Secured to the end portion 13 of the door glass 12 at a further outer position than the slider 14 is a door glass piece 34 having of a substantially crank shape cross section and having a forward end 35 offset into the compartment 16 and projecting in the direction of the outer end.

A portion of this door glass piece 34 is extended along the inner surface of the door glass 12 as shown in FIG. 3 around the guide means to form an extension 34A.

As shown in FIG. 3, this extension 34A together with the slider 14 are fastened and fixed to the door glass 12 through the bolt 28 at a position between the door glass 12 and the slider 14.

The forward end 35 of the door glass piece 34 projects into a guide groove 36 formed on the door frame 18. A pair of lips 38A and 38B of a seal member 38 are disposed in this guide groove 36 and are brought into sliding contact with the outer and inner sides of the forward end 35, so that any space formed between the door glass 12 and the door frame 18 is sealed.

In FIG. 3, designated at 40 is a door molding, 42 a door panel welded to the outer surface of the door frame 18, and 44 a door weather strip secured to the door frame 18, and coming into contact with a center pillar 46 when the side door 10 is closed, to thereby seal a space formed between the door and the vehicle body.

In the rear side portion of the side door 10, the guide means 14 includes two sliders 14A and 14B disposed at the substantially top and bottom ends of the door glass 12, respectively.

With respect to the offset of the sliding members 15 from the door glass 12 into the compartment 16 at the guide means 14A and 14B, it is necessary for the offset value of the lower slider 14B to be larger than the upper offset of the slider 14A.

Furthermore, the forward end 35 of the door glass piece 34 and the guide groove 36 are formed in parallel to the guide channel 20 in the cross section to the vertical line of the door.

Description will be given to the operation of the above-described embodiment.

When the door glass 12 is opened from a fully closed state as shown in FIG. 1, the door glass 12, being regulated in its position in the direction of the thickness of the door glass 12 by the guide channel 20 through guide means 14A, 14B and the sliding member 15, moves downward and is received in the main body 22 of door, as shown in FIG. 2.

At this time, the guide channel 20 is disposed at a position more offset into the compartment 16 than the projected normal arc of curvature 12A of the door glass 12, so that the door glass 12 can be received more inwardly in the vehicle body than in the case where the guide channel 20 is disposed in parallel to the projected normal arc of curvature 12A, thus enabling a narrower main body 22 of the vehicle door.

Further, the door glass piece 34 and the guide groove 36 are formed in parallel with the guide channel 20, so that the sealing function between the forward end 35 of the door glass piece 34 and the seal member 38 is not impaired when the door glass 12 is opened or closed.

According to this embodiment, the guide groove 36 is formed in parallel with the guide channel 20, so that the guide groove 36 has different offset values in the direction of the thickness of the door with respect to the outer surface of the door glass 12 depending on whether the door glass is raised or lowered within the door panel 42. However, this disadvantage is obviated in such a manner that depths of mounting the door moldings 40 are changed depending on the heights thereof, so that the outer surface of the door glass 12 in a fully closed state can be held flush with the outer surface of the door panel 42.

According to the present invention, the upper and lower guide means 14A and 14B have offset values for the sliding members 15 from the door glass 12 into the compartment 16 which are different from each other. Specifically the offset value of the lower slider 14B is larger than that of the upper slider 14A. As a result, the displacement of the door glass 12 at the window line 22A at the upper end of the main body 22 of door in the direction of the thickness of the door glass 12 is reduced when the door glass 12 is opened. The door glass 12 is held in contact with the weather strip (not shown) provided on the beltline portion 22A whether or not the window is opened or closed.

According to the above embodiment, the side door 10 having the guide means 14 and the door glass piece 34, and the door glass 12 is regulated in its position in the direction of the thickness depending on the position of the door glass 12 relative to the guide channel 20 and the guide means 14. However, the present invention need not necessarily be limited to this, and, any door glass piece may be adopted provided the door glass piece is secured to the end portion 13 of the door glass 12, a sliding portion of which is offset into the compartment 16.

Figure 4:
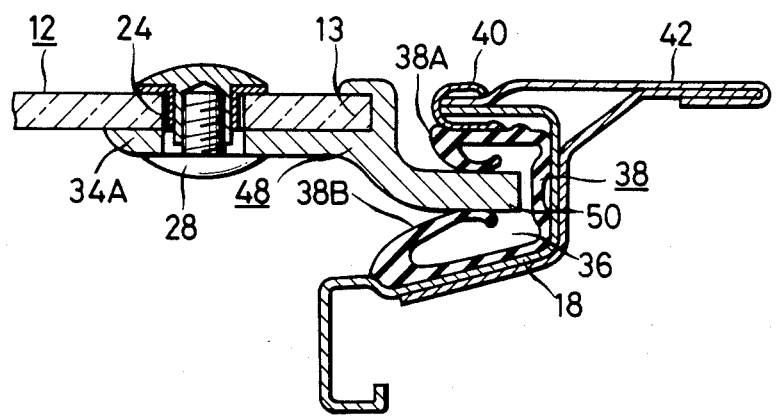
FIG. 4 is a sectional view similar to FIG. 3, showing a second embodiment of the present invention.

As a consequence, for example, as shown in FIG. 4, a door glass piece 48 may perform the function of the guide means 14 in the first embodiment described above.

In addition, the door glass piece 48 performs the sealing function and is regulated in its position in the direction of the thickness of the door glass by the guide groove 36. The guide groove 36 is more offset into the compartment 16 than the projected normal arc of curvature 12A of the door glass 12 and a forward end 50 of the door glass piece 48 may be in parallel with the guide groove 36.

In the above-described embodiment, the sliding members 15 and the upper and lower guide means 14A and 14B are different with respect to the extent of projecting into the compartment 16. Nevertheless, the present invention need not necessarily be limited to this and, the offset values of the sliding members 15 at the upper and lower sliders 14A and 14B may be equal to each other.

What is claimed is:

1. A vehicle door comprising:
    a door section having a door panel and a window frame, said door panel having an inner housing extending between an exterior and an interior of said vehicle when said door section is closed, said inner housing including an opening along an upper surface of said door panel, said window frame being secured to said door section at opposite ends of said opening and defining a window section;
    a door glass slidably mounted within said window section and said inner housing, said door glass having an arcuate configuration when viewed in cross section in the direction of the length of the vehicle and defining a projected normal arc of curvature corresponding to said arcuate configuration of said door glass extending downward from said door glass when said door glass is in a closed position covering said window section, wherein at least a substantial portion of said door glass is housed within said inner housing when said door glass is slidably positioned to an open position; and
    channel means for guiding said door glass between said open and said closed positions, said channel means having an actual arc of curvature when viewed in cross section in the direction of the length of the vehicle, said actual arc of curvature being displaced radially inward from said projected normal arc of curvature within said inner housing, so that said door glass is proximate said interior of said vehicle in said open position, while being substantially flush with said, exterior of said door panel when in said closed position.

2. The vehicle door defined in claim 1, wherein said channel means includes a guide channel and guide means for riding within said guide channel, said guide means having attachment means secured to said door glass for positioning said door glass in response to movement of said guide means within said guide channel.

3. The vehicle door defined in claim 2, wherein said guide means includes an upper sliding member and a lower sliding member slidably engaged with said guide channel, said attachment means connected to said lower sliding member and said upper sliding member being offset radially outward relative to said actual arc of curvature, the offset corresponding to said lower sliding member being greater than the offset corresponding to said upper sliding member.

4. The vehicle door defined in claim 2, wherein said guide means includes an upper sliding member and a lower sliding member slidably engaged with said guide channel, said attachment means connected to said lower sliding member and said upper sliding member being offset radially outward relative to said actual arc of curvature, the offset corresponding to said lower sliding member being substantially equal to the offset corresponding to said upper sliding member.

5. The vehicle door defined in claim 2, further comprising:
    a guide groove secured to said window frame; and
    extension means secured by said attachment means along an interior surface of said door glass for sealing a gap between said window frame and said door glass, said extension means having an end portion slidably positioned within said guide groove.

6. The vehicle door defined in claim 5, further comprising sealing means affixed within said guide groove for firmly positioning said end portion of said extension means within said guide groove.

7. The vehicle door defined in claim 1, wherein said channel means includes:
    a guide groove secured to said window frame;
    attachment means secured to said door glass for holding said door glass; and
    extension means secured by said attachment means along an interior surface of said door glass for sealing a gap between said window frame and said door glass, said extension means having an end portion being slidably positioned within said guide groove.

8. The vehicle door defined in claim 7, further comprising sealing means affixed within said guide groove for firmly positioning said end portion of said extension means within said guide groove.

* * * * *